(12) United States Patent
He et al.

(10) Patent No.: US 11,680,848 B2
(45) Date of Patent: Jun. 20, 2023

(54) METHOD FOR IDENTIFYING MODAL FREQUENCY OF BEAM BRIDGE BY CONSIDERING INFLUENCE OF ENVIRONMENTAL TEMPERATURE

(71) Applicant: Hefei University of Technology, Anhui Province (CN)

(72) Inventors: Wenyu He, Anhui Province (CN); Lei Zhou, Anhui Province (CN); Zuocai Wang, Anhui Province (CN); Weixin Ren, Anhui Province (CN)

(73) Assignee: Hefei University of Technology, Anhui Province (CN)

( * ) Notice: Subject to any disclaimer, the term of this patent is extended or adjusted under 35 U.S.C. 154(b) by 0 days.

(21) Appl. No.: 17/877,364

(22) Filed: Jul. 29, 2022

(65) Prior Publication Data

US 2023/0067034 A1 Mar. 2, 2023

(30) Foreign Application Priority Data

Aug. 17, 2021 (CN) .......................... 202110941218.7

(51) Int. Cl.
| | |
|---|---|
| *G01H 1/14* | (2006.01) |
| *G01D 3/036* | (2006.01) |
| *G01D 21/02* | (2006.01) |
| *G01K 7/02* | (2021.01) |
| *G06F 17/14* | (2006.01) |

(52) U.S. Cl.
CPC ............. *G01H 1/14* (2013.01); *G01D 3/0365* (2013.01); *G01D 21/02* (2013.01); *G01K 7/02* (2013.01); *G06F 17/14* (2013.01)

(58) Field of Classification Search
CPC ........ G01H 1/14; G01D 3/0365; G01D 21/02; G01K 7/02; G06F 17/14
USPC .......................... 73/579; 702/33, 56, 127, 189
See application file for complete search history.

(56) References Cited

FOREIGN PATENT DOCUMENTS

CN 108318126 * 6/2021

* cited by examiner

*Primary Examiner* — Robert R Raevis
(74) *Attorney, Agent, or Firm* — Venable LLP (57) ABSTRACT

The disclosure provides a method for identifying a modal frequency of a beam bridge by considering influence of environmental temperature. The method includes the following steps: installing a sensor on a newly-built beam bridge without damage, measuring a dynamic response of the beam bridge cinder ambient excitation, recording temperature data, processing by a modal parameter identification method to obtain a modal frequency value at the temperature, and starting from a modal frequency corresponding to the temperature, carrying out iterative calculation to obtain the modal frequency at any temperature. The modal frequency value at any temperature is obtained by arranging a small number of sensors and carrying out a small number of tests, so that the influence of the temperature on the modal frequency is quantified, furthermore, the part of environmental influence is eliminated in future damage evaluation of the beam bridge, which allows for a more accurate damage evaluation result.

1 Claim, 6 Drawing Sheets

METHOD FOR IDENTIFYING MODAL FREQUENCY OF BEAM BRIDGE BY CONSIDERING INFLUENCE OF ENVIRONMENTAL TEMPERATURE

CROSS REFERENCE TO RELATED APPLICATION

This patent application claims the benefit and priority of Chinese Patent Application No. 202110941218.7, filed on Aug. 17, 2021, the disclosure of which is incorporated by reference herein in its entirety as part of the present application.

TECHNICAL FIELD

The present disclosure relates to the field of vibration-based health monitoring of beam bridges, and in particular to a method for identifying the modal frequency of a beam bridge by considering the influence of environmental temperature.

BACKGROUND ART

With the rapid development of the social economy, an increasing number of large-span beam bridges have been put into use. In the meanwhile, more and more attention has been paid to structure safety. Modal analysis is of great significance to safety diagnosis of large-span structures. Modal parameters include frequency, damping ratio, and mode shape, which can be used to monitor and detect the health status of structures, and are widely used in damage identification and health assessment of beam structures. As one of the main modal parameters, structural modal frequency, featured by convenient measurement and high precision, is widely used as a common performance index of structures, and as a basic physical measurement method used in various structural evaluation. However, in the actual process, the change of environmental temperature may also cause the change of structural modal frequency, and even cover up the change caused by damage, which makes it difficult to implement a vibration-based damage identification method. Therefore, quantifying the influence of environmental temperature on structural frequency to further eliminate the influence of environmental temperature on modal frequency is an essential step in the process of damage identification.

SUMMARY

An objective of the present disclosure is to provide a method for identifying a modal frequency of a beam bridge by considering the influence of environmental temperature without the need for real-time monitoring of the beam bridge, so as to eliminate the influence of the environmental temperature in damage evaluation and obtain the modal frequency of the beam bridge at any temperature, thereby improving the accuracy of damage identification.

In order to achieve the foregoing objective, the present disclosure employs the following technical solution:

The present disclosure provides a method for identifying a modal frequency of a beam bridge by considering the influence of environmental temperature, including the following steps:

Step 1: determining a length L and a section parameter of the beam bridge; and in a length direction of the beam bridge, arranging 1 acceleration sensor and 1 thermocouple in each span;

Step 2: obtaining an acceleration response of the beam bridge subjected to a moving load at different temperatures using the acceleration sensor and the thermocouple with a sampling frequency of $f_s$, selecting any of the temperatures as a reference temperature $T_0$, and obtaining the reference temperature $T_0$ and a corresponding acceleration response;

Step 3: conducting Fourier transform on the acquired acceleration response to obtain first n orders of frequencies of the beam bridge which are denoted as $\{f_1^*|n=1,2,3\}$ where $f_n^*$ denotes an nth order measured frequency; and selecting the reference temperature $T_0$, and corresponding first n orders of frequencies $\{f_n(T_0)|n=1,2,3\}$, where $f_n(T_0)$ denotes an nth order frequency corresponding to the reference temperature $T_0$;

Step 4: obtaining a slope $k_0$ between the nth order frequency $f_n(T_0)$ and the reference temperature $T_0$ according to formula (1):

$$k_0 = \frac{1}{2}\beta_E \cdot f_n(T_0) \tag{1}$$

where in formula (1), $\beta_E$ denotes a thermal coefficient of an elasticity modulus of a beam bridge's material;

Step 5: starting from a given point $(T_0, f_n(T_0))$, constructing the slope $k_0$ in a frequency-temperature relation at an interval of $T_0 \sim T_0 + \Delta T$ to obtain an nth order frequency $f_n(T_0+\Delta T)$ corresponding to a temperature $T_0+\Delta T$, where $\Delta T$ denotes a temperature increment;

$$f_n(T_0+\Delta T)=f(T_0+k_0\Delta T \tag{2}$$

Step 6: defining a variable i, and initializing to 1;

Step 7: obtaining an nth order frequency $f_n(T_i)$ corresponding to an ith temperature $T_i$ between the reference temperature $T_0$ and a target temperature $T_m$ according to formula (2):

$$f_n(T_i)=f_n(T_{i-1})+k_{i-1}\Delta T_{i-1} \tag{3}$$

where in formula (2), $\Delta T_{i-1}$ denotes a temperature interval between an (i-1)th temperature $T_{i-1}$ and the ith temperature $T_i$, and when i=1, $T_{i-1}=T_0$; $f_n(T_{i-1})$ denotes an nth order frequency corresponding to the (i-1)th temperature $T_{i-1}$, and when i=1, $f_n(T_{i-1})=(T_0)$; and $k_{i-1}$ denotes an instantaneous slope between the nth order frequency $f_n(T_{i-1})$ and the (i-1)th temperature $T_{i-1}$ and when i=1, $k_{i-1}=k_0$;

Step 8: obtaining an ith slope $k_i$, according to formula (3):

$$k_i = \frac{1}{2}\beta_E \cdot f_n(T_i) \tag{4}$$

Step 9: after assigning i+1 to i, returning to Step 7, and performing sequential execution until i=m; and.

Step 10: obtaining an nth order frequency $f_n(T_m)$ corresponding to the target temperature $T_m$ according to formula (3) and formula (4):

$$f_n(T_m) = f_n(T_0) + \frac{1}{2}\beta_E \sum_{i=0}^{m-1} f_n(T_i) \cdot \Delta T_i \tag{5}$$

Compared with the prior art, the present disclosure has the following beneficial effects:

1. Given a frequency corresponding to a single temperature, the frequency at any temperature can be obtained by arranging a small number of sensors and carrying out a small quantity of tests and iterative solutions, so as to quantify the influence of temperature on modal frequency without the need for real-time monitoring of the frequency change under the temperature change, thereby obtaining the influence of temperature on the frequency more directly and effectively.

2. With the complexity of the modal frequency identification process taken into consideration, all that is required is to process a group of data of a newly-built beam bridge without damage at a single temperature to obtain a modal frequency value at the temperature, and then a modal frequency of the beam bridge at any temperature is available, which simplifies the process of modal frequency identification.

3. After the beam bridge is put into operation, all that is required is to process a group of data at any temperature, obtain a modal frequency value at the temperature, and compare it with a modal frequency at the corresponding temperature of a newly-built beam bridge without damage. In this way, the part of environmental influence is eliminated in damage evaluation of the beam bridge, which allows for a more accurate damage evaluation result.

DETAILED DESCRIPTION OF THE EMBODIMENTS

Figure 1:
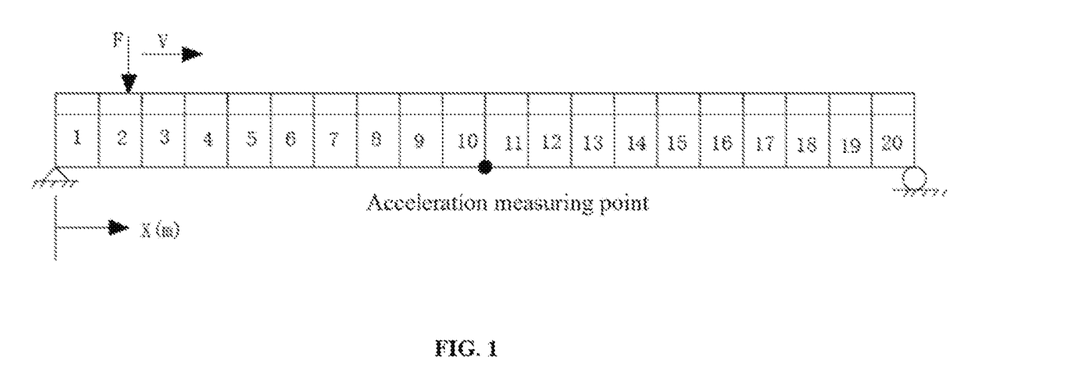
FIG. 1 is a diagram of a simply-supported beam bridge with a constant section of a finite element model according to the present disclosure.

In this embodiment, a method for identifying the modal frequency of a beam bridge by considering the influence of environmental temperature is provided. A T-shaped simply-supported beam with a constant section is taken as Embodiment 1, and a concentrated force with a magnitude of 80 kg passes through the beam bridge at a uniform speed of 0.1 m/s; a model is established by finite element software; the elasticity modulus under the influence of different temperatures is set to obtain a model at different temperatures; and the beam bridge is divided into 20 planar Euler beam elements at an equal spacing. The finite element model of the simply-supported beam is shown in FIG. 1. The method includes the following steps:

Step 1: determine the length L and the section parameter of the beam bridge. In this embodiment, the beam has a length of 4.08 m, and moment of inertia, of the section of $1.355 \times 10^{-3} m^4$, the elasticity modulus E of the beam changes with temperature, and the mass per linear meter of 331.5 kg/m, In the length direction of the beam bridge, 1 acceleration sensor and 1 thermocouple are arranged in each span, as shown in FIG. 1.

Figure 2:
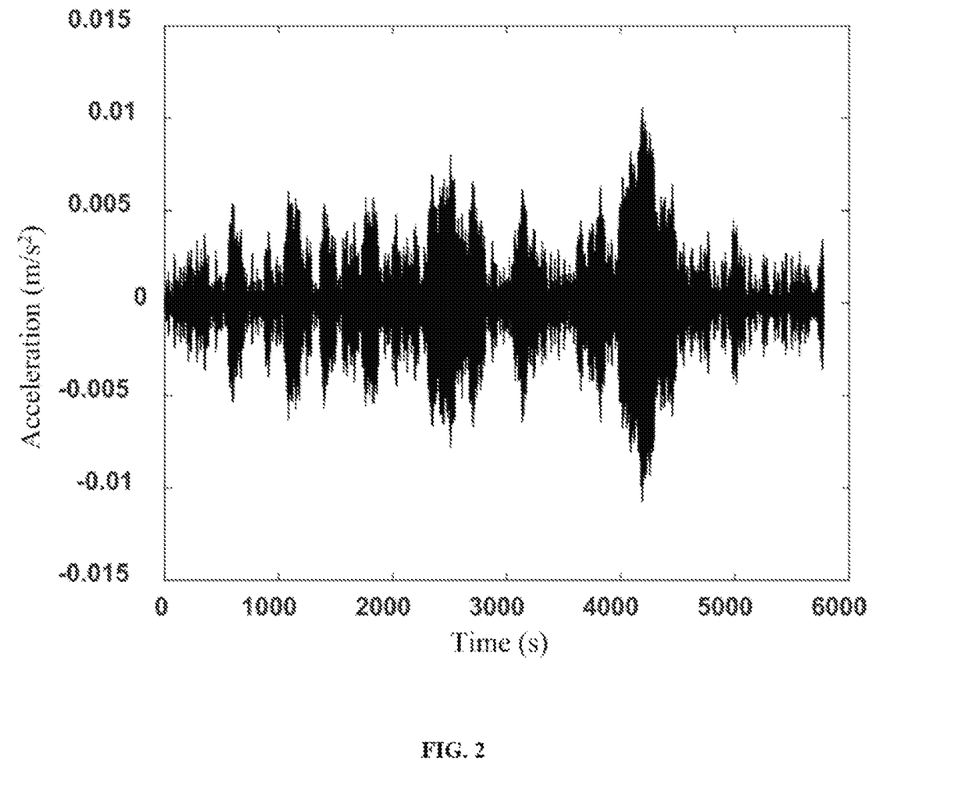
FIG. 2 is a diagram of the acceleration response of a simply-supported beam at 25° C. according to the present disclosure.
Figure 3:
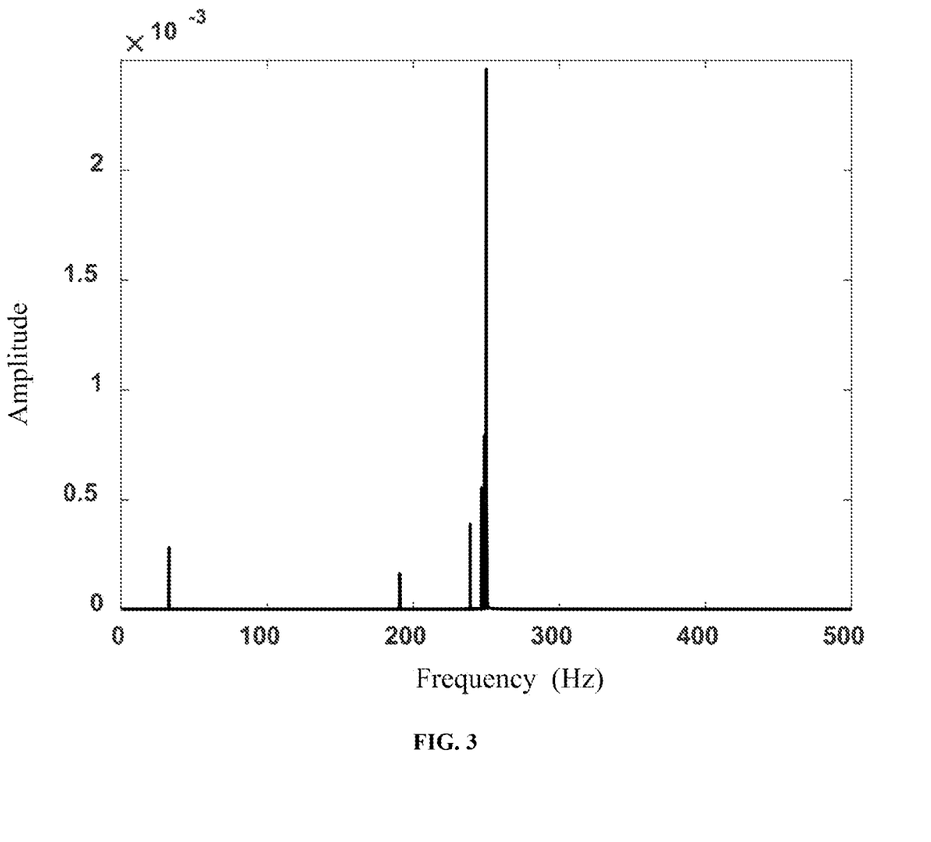
FIG. 3 is a spectrogram of the acceleration response of a simply-supported beam at 25° C. according to the present disclosure.

Step 2: as shown in FIG. 2 obtain the acceleration response of the beam bridge subjected to a moving load at different temperatures using the acceleration sensor and the thermocouple with the sampling frequency of $f_s=100$ Hz, select any of the temperatures as a reference temperature $T_0=19°$ C. and obtain the reference temperature $T_0$ and the corresponding acceleration response;

Step 3: conduct Fourier transform on the acquired acceleration response, and obtain, by Peak-Picking (PP), first n orders of frequencies of the beam bridge at different temperatures which are denoted as $\{f_n^*|n=1,2,3\}$, where $f_n$ denotes the nth order measured frequency, frequency spectrum of the acceleration response of a simply-supported beam is shown in FIG. 3, and the first three orders of frequencies of the beam bridge measured at certain temperatures are shown in Table 1.

Select the reference temperature $T_0=19°$ C. and the corresponding first n orders of frequencies $\{f_n(T_0)|n=1,2,3\}$, where $f_n(T_0)$ denotes the nth order frequency corresponding to the reference temperature $T_0$. In this embodiment, reference temperature 19° C. and the corresponding first three orders of frequencies $f_n(19)$ are selected, as shown in Table 1.

TABLE 1

| | First three orders of frequencies of a beam bridge measured at certain temperatures | | | | |
|---|---|---|---|---|---|
| T | −8 | 7 | 19 | 28 | 47 |
| $f_1^*$ | 36.279 | 34.848 | 33.660 | 32.740 | 30.709 |
| $f_2^*$ | 145.117 | 139.394 | 134.641 | 130.963 | 122.836 |
| $f_3^*$ | 326.523 | 313.646 | 302.950 | 294.674 | 276.389 |

Step 4: obtain a slope $k_0$ between the nth order frequency $f_n(T_0)$ and the reference temperature $T_0$ according to formula (1):

$$k_0 = \frac{1}{2}\beta_E \cdot f_n(T_0) \quad (1)$$

In formula (1), $\beta_E$ d denotes the thermal coefficient of the elasticity modulus of the beam bridge's material. In this embodiment. $4.5 \times 10^{-3}°$ $C.^{-1}$ is taken as $\beta_E$, and according to formula. (1), $k_0$ corresponding to three orders of frequencies of the beam bridge at 1.9° C. is −0.0757, 0.3029 and −0.6816.

Step 5: starting from a given point $(T_0, f_n(T_0))$, construct the slope $k_0$ in a frequency-temperature relation at an interval of $T_0 \sim T_0+\Delta T$ to obtain the nth order frequency $f_n(T_0+\Delta T)$ corresponding to the temperature $T_0+\Delta T$ where $\Delta T$ denotes the temperature increment;

$$f_n(T_0+\Delta T)=f_n(T_0)+k_0\Delta T \quad (2)$$

In this embodiment, ±1° C. is taken as $\Delta T$, based on first three orders of frequencies $f_n(19)$ corresponding to the reference temperature 19° C., the relation of the first three orders of frequencies and the temperature at the interval of 19° C.-18° C. and the relation of the first three orders of frequencies and the temperature at the interval of 19° C.-18° C. are constructed with the corresponding slope $k_0$; so that first three orders of frequencies $f_n(20)$ and $f_n(18)$ corresponding to temperatures of 20° C. and 18° C. are obtained.

Step 6: define a variable i, and initialize i to 1;

Step 7: obtain the nth order frequency $f_n(T_i)$ corresponding to the ith temperature $T_i$ between the reference temperature $T_0$ and the target temperature $T_m$ according to formula (2):

$$f_n(T_i) = f_n(T_{i-1}) + k_{i-1}\Delta T_{i-1} \quad (3)$$

In formula (2), $\Delta T_{i-1}$ denotes the temperature interval between an (i-1)th temperature $T_{i-1}$ and the ith temperature $T_i$, and when i=1, $T_{i-1}=T_0$; $f_n(T_{i-1})$ denotes the nth order frequency corresponding to the (i-1)th temperature $T_{i-1}$, and when i=1, $f_n(T_{i-1})=f_n(T_0)$; and $k_{i-1}$ denotes the instantaneous slope between the nth order frequency $f_n(T_{i-1})$ and the (i-1)th temperature $T_{i-1}$, and when i=1, $k_{i-1}=k_0$. In this embodiment, $\Delta T_{i-1}$ is ±1° C.

Step 8: obtain an ith slope $k_i$ according to formula (3):

$$k_i = \frac{1}{2}\beta_E \cdot f_n(T_i) \quad (4)$$

Step 9: after assigning i+1 to i, return to Step 7, and perform sequential execution until i=m.

Step 10: obtain the nth order frequency $f_n(T_m)$ corresponding to the target temperature $T_m$ according to formula (3) and formula (4):

$$f_n(T_m) = f_n(T_0) + \frac{1}{2}\beta_E \sum_{i=0}^{m-1} f_n(T_i) \cdot \Delta T_i \quad (5)$$

In this embodiment, when the target temperature $T_m$ is 47° C., $\Delta T_i$ is 1° C.; and when the target temperature $T_m$ is −8° C. $\Delta T_i$ is −1° C. According to formula (3) and formula (4), first three orders of frequencies of the beam bridge at the target temperature and certain intermediate temperatures are calculated through theoretical iterations, as shown in Table 2.

TABLE 2

First three orders of frequencies of a beam bridge at certain temperatures calculated through theoretical iterations

| T | −8 | 7 | 19 | 28 | 47 |
|---|---|---|---|---|---|
| $f_1$ | 35.766 | 34.580 | 33.660 | 32.985 | 31.603 |
| $f_2$ | 143.064 | 138.322 | 134.641 | 131.939 | 126.411 |
| $f_3$ | 321.903 | 311.232 | 302.950 | 296.871 | 284.433 |

Figure 4:
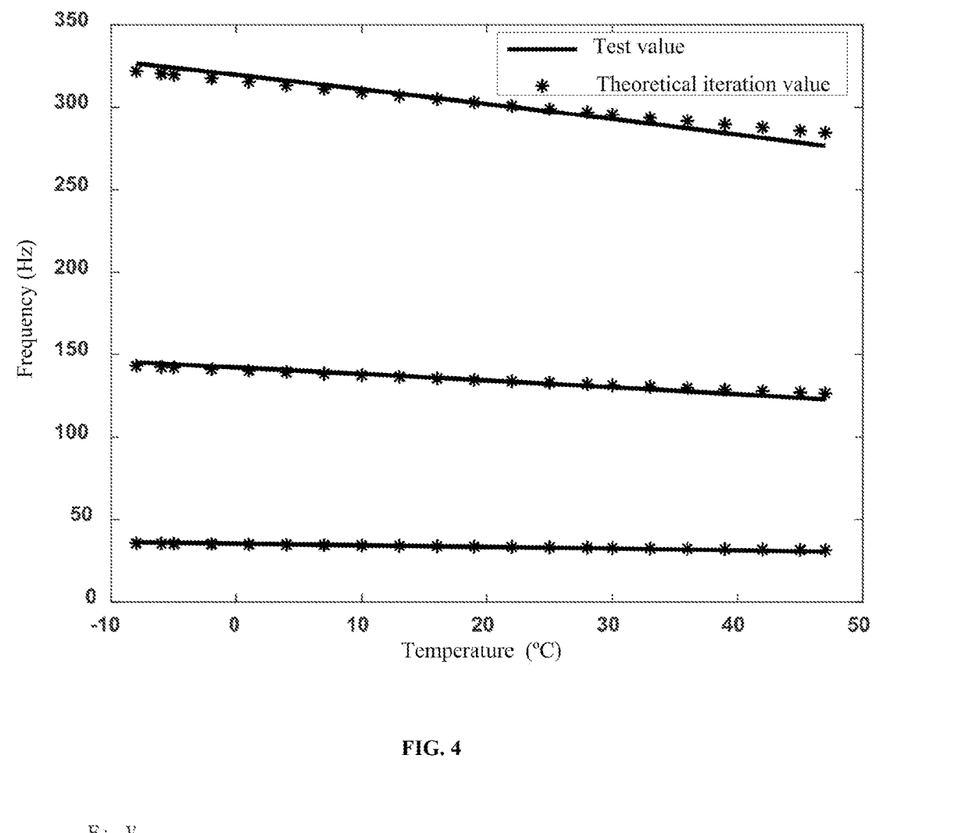
FIG. 4 is a comparison diagram of first three orders of frequencies of a simply-supported beam obtained through theoretical iterations and tests according to the present disclosure.

Step 11: compare the theoretical iteration result $f_n$ with the test result $f_n^*$, as shown in FIG. 4. In the meanwhile, calculate the relative error $\varepsilon_n$, according to formula (6), as shown in Table 3:

$$\varepsilon_n = \frac{|f_n - f_n^*|}{f_n^*} \quad (6)$$

TABLE 3

Relative error between the theoretical iteration result and the test frequency result at certain temperatures

| T | −8 | 7 | 19 | 28 | 47 |
|---|---|---|---|---|---|
| $\varepsilon_n$ | 1.41% | 0.77% | / | 0.75% | 2.91% |

Figure 5:
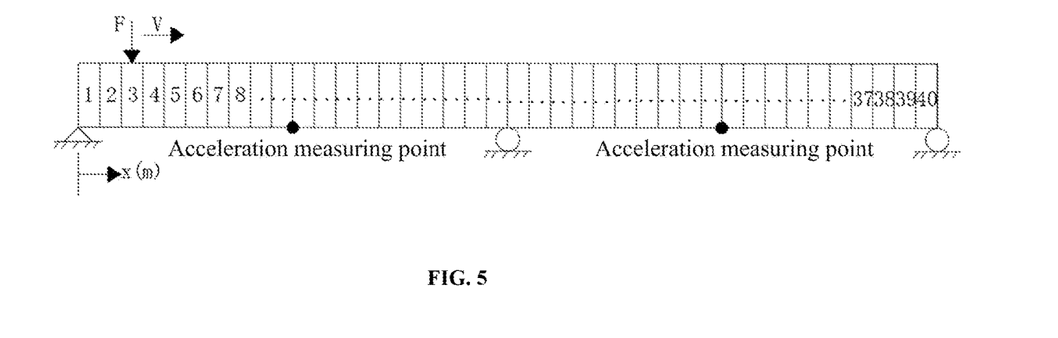
FIG. 5 is a diagram of a two-span continuous beam bridge with a constant section of a finite element model according to the present disclosure.
Figure 6:
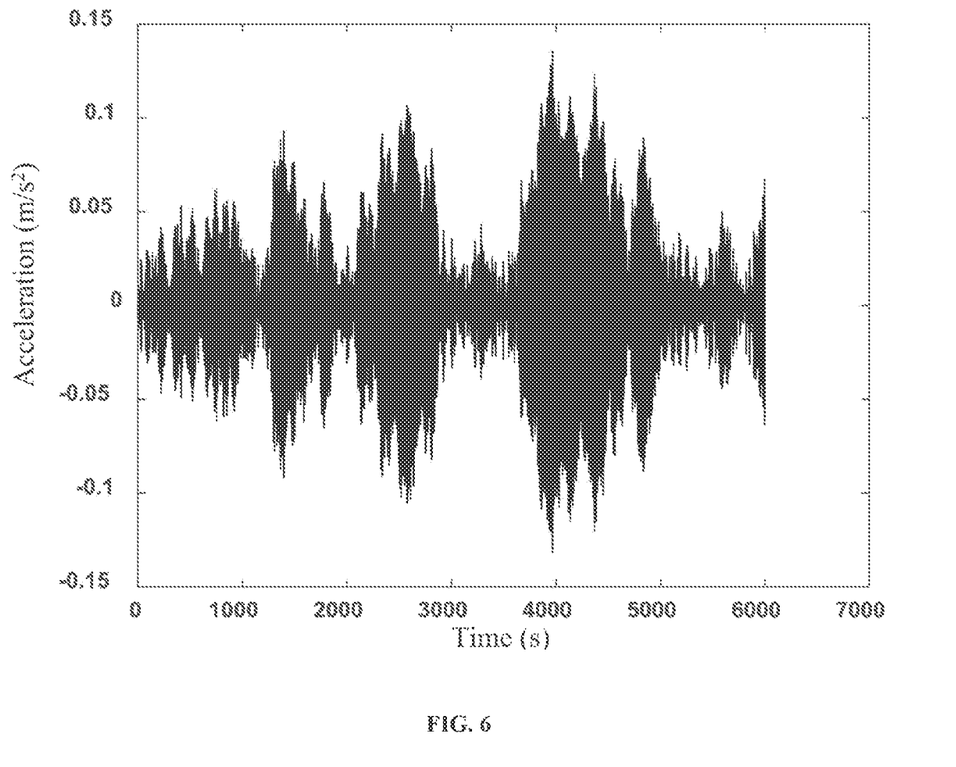
FIG. 6 is a diagram of the acceleration response of a two-span continuous beam bridge at 25° C. according to the present disclosure.
Figure 7:
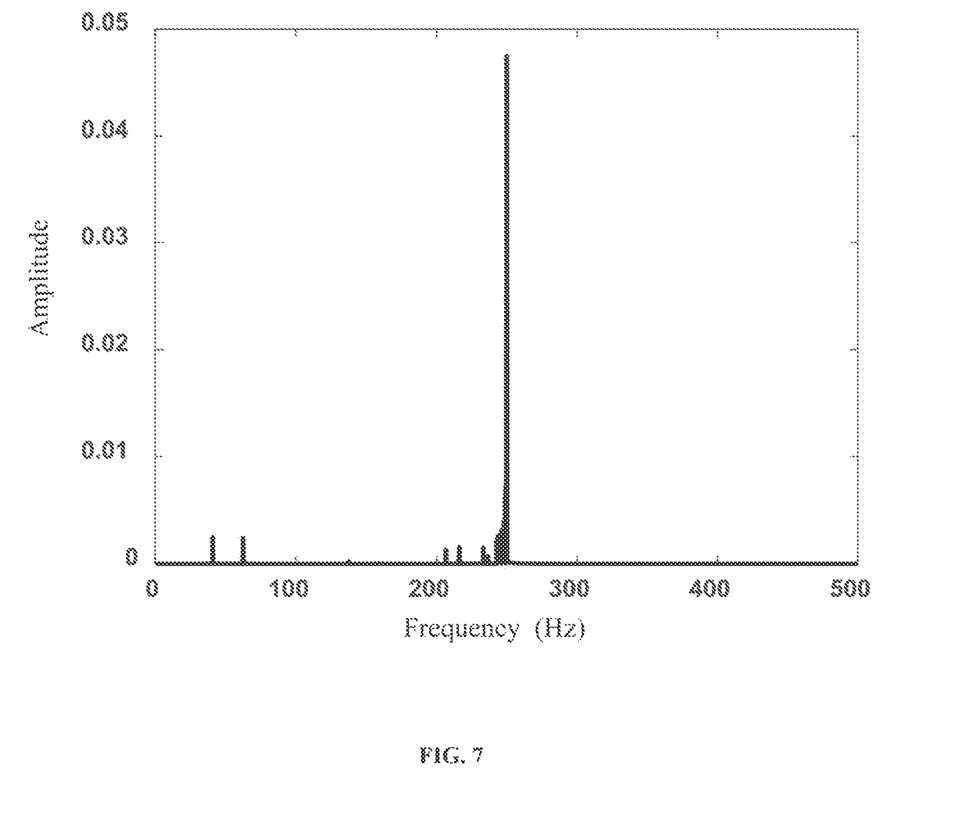
FIG. 7 is a spectrogram of the acceleration response of a two-span continuous beam bridge at 25° C. according to the present disclosure.
Figure 8:
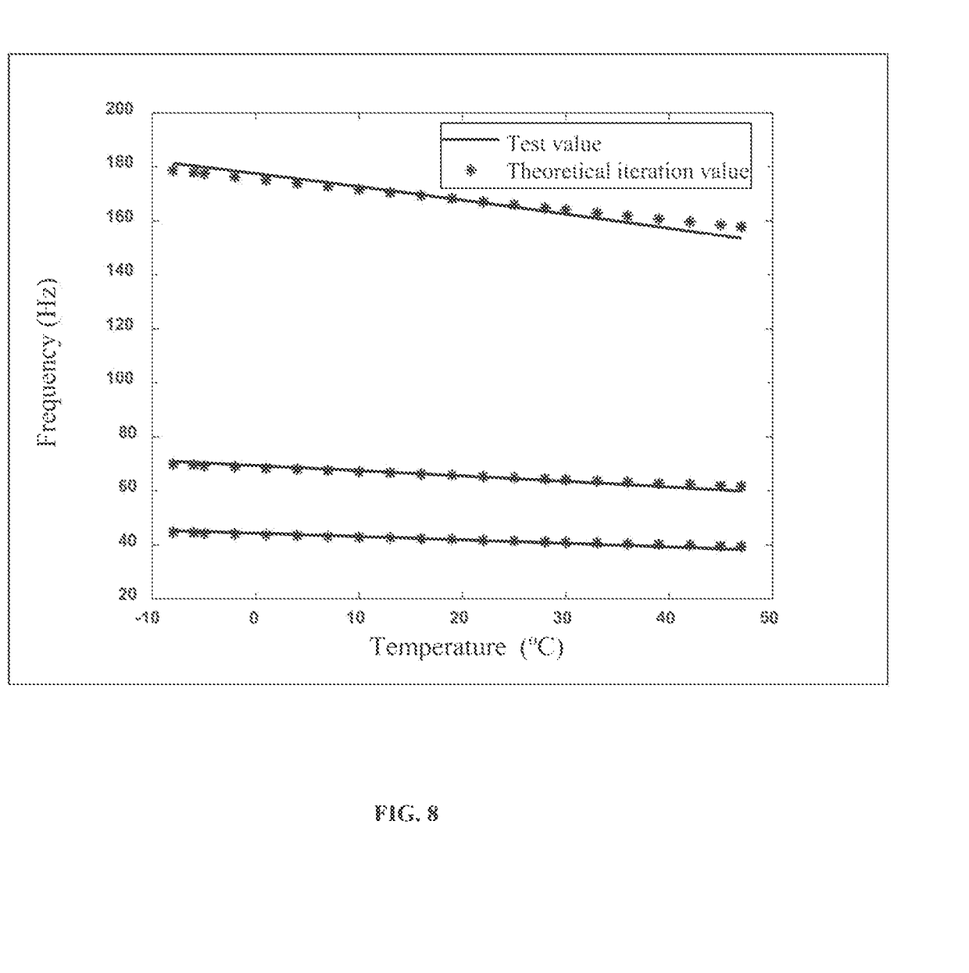
FIG. 8 is a comparison diagram of first three orders of frequencies of a two-span continuous beam obtained through theoretical iterations and tests according to the present disclosure.

A two-span continuous beam with a constant rectangular section is taken as Embodiment 2. A concentrated force with a magnitude of 80 kg passes through the beam bridge at a uniform speed of 0.1 m/s; a model is established by finite element software; the elasticity modulus under the influence of different temperatures is set to obtain a model at different temperatures; and the beam bridge is divided into 40 planar Euler beam elements at an equal spacing. The finite element of the two-span continuous beam with a constant section is shown in FIG. 5. As shown in FIG. 5, the length of the beam bridge is 4m, the beam bridge has a length of 2m each span, a width of the section of 0.3m a height of 0.1m, and a sectional moment of inertia of $2.5\times10^{-5}m^4$ the elasticity modulus E of the beam bridge changes with the temperature, and the mass per linear meter of 78 kg. In the length direction of the beam bridge, 1 acceleration sensor and 1 thermocouple are arranged in each span, as shown in FIG. 5. Refer to Embodiment 1 for the remaining operating steps. The acceleration response is measured at each span, and the sampling frequency is 100 Hz, as shown in FIG. 6. The spectrogram of the acceleration response is shown in FIG. 7, and a comparison diagram of frequencies of the two-span continuous beam obtained through theoretical iterations and tests is shown in FIG. 8. First three orders of frequencies of the beam bridge measured are shown in Table 4. In the process of theoretical iterations, $\Delta T_i$ is 1° C., $\Delta T_j$ is −1° C., and $\beta_E$ is $4.5\times10^{-3}$° $C.^{-1}$. The first three orders of frequencies calculated through theoretical iterations are shown in Table 5; and the relative error of frequencies obtained through theoretical iterations and tests is shown in Table 6.

TABLE 4

First three orders of frequencies of the beam bridge measured at certain temperatures

| T | −8 | 7 | 19 | 28 | 47 |
|---|---|---|---|---|---|
| $f_1^*$ | 45.320 | 43.533 | 42.049 | 40.900 | 38.362 |
| $f_2^*$ | 70.799 | 68.007 | 65.688 | 63.893 | 59.929 |
| $f_3^*$ | 181.283 | 174.133 | 168.195 | 163.600 | 153.448 |

TABLE 5

First three orders of frequencies of the beam bridge at certain temperatures calculated through theoretical iterations

| T | −8 | 7 | 19 | 28 | 47 |
|---|---|---|---|---|---|
| $f_1$ | 44.679 | 43.198 | 42.049 | 41.205 | 39.478 |
| $f_2$ | 69.797 | 67.484 | 65.688 | 64.370 | 61.673 |
| $f_3$ | 178.718 | 172.793 | 168.195 | 164.820 | 157.915 |

TABLE 6

Relative error between the theoretical iteration result and first three orders of the tested frequencies at certain temperatures

| T | −8 | 7 | 19 | 28 | 47 |
|---|---|---|---|---|---|
| $\varepsilon_n$ | 1.41% | 0.77% | / | 0.75% | 2.91% |

Embodiment 1 and Embodiment 2 fully illustrate that the method of the present disclosure can identify the modal frequency at any temperature without the need for real-time monitoring of the beam bridge at any environmental temperature. At the same time, as lona as the modal frequency value under the influence of an individual temperature is obtained, the modal frequency value under the influence of arbitrary temperature can be obtained, which greatly simplifies the modal frequency processing process. In this way, the influence of environmental temperature on modal frequency is accurately quantified, and the problem that a vibration-based health monitoring system is affected by environmental temperature in damage identification is solved.

What is claimed is:

1. A method for detecting a damage of a beam bridge by considering the influence of environmental temperature, comprising the following steps:

Step 1: determining a length L and a section parameter of the beam bridge; and in a length direction of the beam bridge, arranging 1 acceleration sensor and 1 thermocouple in each span;

Step 2: obtaining an acceleration response of the beam bridge subjected to a moving load at different temperatures using the acceleration sensor and the thermocouple with a sampling frequency of $f_s$, selecting any of the temperatures as a reference temperature $T_0$, and obtaining the reference temperature $T_0$ and a corresponding acceleration response;

Step 3: conducting Fourier transform on the acquired acceleration response to obtain first n orders of frequencies of the beam bridge which are denoted as $\{f_n*|n=1,2,3\}$ where $f_n*$ denotes an nth order frequency; and selecting the reference temperature $T_0$ and corresponding first n orders of frequencies $\{f_n(T_0)|n=1,2,3\}$, where $f_n(T_0)$ denotes an nth order frequency corresponding to the reference temperature $T_0$;

Step 4: obtaining a slope $k_0$ between the nth order frequency $f_n(T_0)$ and the reference temperature $T_0$ according to formula (1):

$$k_0 = \frac{1}{2}\beta_E \cdot f_n(T_0) \quad (1)$$

wherein in formula (1), $\beta_E$ denotes a thermal coefficient of an elasticity modulus of a beam bridge's material;

Step 5: starting from a given point $(T_0, f_n(T_0))$, constructing a frequency-temperature relation in an interval of $T_0 \sim T_0+\Delta T$ based on the slope $k_0$ to obtain an nth order frequency $f_n(T_0+\Delta T)$ corresponding to a temperature $T_0+\Delta T$, where $\Delta T$ denotes a temperature increment;

$$f_n(T_0+\Delta T)=f(T_0+k_0\Delta T \quad (2)$$

Step 6: defining a variable i, and initializing i to 1;

Step 7: obtaining an nth order frequency $f_n(T_i)$ corresponding to an ith temperature $T_i$ between the reference temperature $T_0$ and a target temperature $T_m$ according to formula (2):

$$f_n(T_i)=f_n(T_{i-1})+k_{i-1}\Delta T_{i-1} \quad (3)$$

wherein in formula (3), $\Delta T_{i-1}$ denotes a temperature interval between an (i-1)th temperature $T_{i-1}$ and the ith temperature $T_i$, and when i=1, $T_{i-1}=T_0$; $f_n(T_{i-1})$ denotes an nth order frequency corresponding to the (i-1)th temperature $T_{i-1}$, and when i=1, $f_n(T_{i-1})=(T_0)$; and $k_{i-1}$ denotes an instantaneous slope between the nth order frequency $f_n(T_{i-1})$ and the (i-1)th temperature $T_{i-1}$, and when i=1, $k_{i-1}=k_0$;

Step 8: obtaining an ith slope $k_i$ according to formula (3):

$$k_i = \frac{1}{2}\beta_E \cdot f_n(T_i) \quad (4)$$

after assigning i+1 to i, returning to Step 7, and performing sequential execution until i=m;

Step 10: obtaining an nth order frequency $f_n(T_m)$ corresponding to the target temperature $T_m$ according to formula (3) and formula (4):

$$f_n(T_m) = f_n(T_0) + \frac{1}{2}\beta_E \sum_{i=0}^{m-1} f_n(T_i) \cdot \Delta T_i; \quad (5)$$

and

Step 11: detecting the damage of the beam bridge based on the nth order frequency $f_n(T_m)$.

* * * * *